(12) United States Patent
Pai et al.

(10) Patent No.: US 7,284,072 B2
(45) Date of Patent: Oct. 16, 2007

(54) DMA ENGINE FOR FETCHING WORDS IN REVERSE ORDER

(75) Inventors: Ramadas Lakshmikanth Pai, Bangalore (IN); Manoj Kumar Vajhallya, Bangalore (IN); Chhavi Kishore, Bangalore (IN); Bhaskar Mala Sherigar, Bangalore (IN); Himakiran Kodihalli, Bangalore (IN); Sandeep Bhatia, Bangalore (IN); Gaurav Aggarwal, Bangalore (IN); Sivagururaman Mahadevan, Bangalore (IN); Vijayanand Aralaguppe, Bangalore (IN)

(73) Assignee: Broadcom Corporation, Irvine, CA (US)

( * ) Notice: Subject to any disclaimer, the term of this patent is extended or adjusted under 35 U.S.C. 154(b) by 33 days.

(21) Appl. No.: 10/735,980

(22) Filed: Dec. 15, 2003

(65) Prior Publication Data

US 2005/0038938 A1    Feb. 17, 2005

Related U.S. Application Data

(60) Provisional application No. 60/494,666, filed on Aug. 13, 2003, provisional application No. 60/494,746, filed on Aug. 13, 2003.

(51) Int. Cl.
*G06F 3/00* (2006.01)
*G06F 13/28* (2006.01)
*G06F 13/12* (2006.01)
*G06F 13/38* (2006.01)
*G06F 12/00* (2006.01)

(52) U.S. Cl. .............................. 710/22; 710/1; 710/52; 710/62; 710/65; 711/1; 711/4; 711/100

(58) Field of Classification Search .................. 710/22; 380/217
See application file for complete search history.

(56) References Cited

U.S. PATENT DOCUMENTS

| 4,608,633 | A | * | 8/1986 | Boothroyd et al. | .......... 711/214 |
| 4,704,641 | A | * | 11/1987 | Stohs | ........................... 360/53 |
| 6,665,082 | B1 | * | 12/2003 | Takeoka et al. | ............ 358/1.15 |
| 6,795,208 | B1 | * | 9/2004 | Tanaka | ....................... 358/1.16 |
| 6,876,705 | B2 | * | 4/2005 | Katsavounidis et al. | ...................... 375/240.28 |
| 2004/0131118 | A1 | * | 7/2004 | Kim et al. | ............. 375/240.12 |

* cited by examiner

*Primary Examiner*—Donald Sparks
*Assistant Examiner*—Richard B. Franklin
(74) *Attorney, Agent, or Firm*—McAndrews Held & Malloy Ltd.

(57) ABSTRACT

Presented herein is a direct memory access engine for providing data words in the reverse order. The data words are fetched in batches comprising a predetermined number of data words starting from the last data word and proceeding to the first data word. The batches are stored in a local buffer. The contents of the local buffer are transmitted in reverse order.

17 Claims, 5 Drawing Sheets

DMA ENGINE FOR FETCHING WORDS IN REVERSE ORDER

RELATED APPLICATIONS

This application claims priority to Provisional Application for U.S. Patent Ser. No. 60/494,666, entitled "DMA Engine for Fetching Words in Reverse Order", filed Aug. 13, 2003, and Provisional Application for U.S. Patent Ser. No. 60/494,746, entitled "DMA Engine for Fetching Words in Reverse Order", filed Aug. 13, 2003, which are incorporated herein by reference for all purposes.

This application is also related to Application for U.S. Patent Ser. No. 10/736,125, entitled "DMA Engine for Fetching Words in Reverse Bit Order", filed Dec. 12, 2003, which is incorporated herein by reference.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

The MPEG-2 standard uses video packets comprising any number of macroblocks to confine bit errors. Frames are represented by a set of macroblocks. The macroblocks are grouped into a data structure known as a video packet. In MPEG-2, all macroblock rows start with a new video packet. During the decoding of a video packet, if an error is encountered, the video decoder can simply drop the remaining macroblocks that followed the bit error. In this manner, only a small amount of information is lost as a result of the bit error.

MPEG-4 Part 2 also uses video packets to confine bit errors. The video data is transmitted as a video elementary stream. The portions of the video elementary stream that are at the video packet level and lower are encoded with a variable length code. In MPEG-4 Part 2, the video packet is defined such that the video packet can be decoded in a forward order, or the reverse order. Accordingly, after encountering an error, the video decoder can go to the end of the video packet, and start decoding in the reverse order, until the same error, or another error is encountered. In this manner, a greater portion of the video packet is recovered and reconstructed, in spite of encountering error(s).

To take advantage of the foregoing feature, the video decoder needs to be able to receive and decode the video bitstream in reverse order in real-time. During the decoding, the video elementary stream is stored in a memory known as the compressed data buffer in the forward order, along with a table that indicates the starting addresses of each video packet. The video decoder receives and decodes the video elementary stream by accessing the compressed data buffer. Upon encountering an error, the video decoder can receive the video packet at the ending address of the video packet and moving in the reverse order.

Receiving the video packet in reverse order can be made possible by manipulating the memory access. For example, the video decoder can sequentially access data words in reverse order. After accessing each data word, the video decoder can use logic to reverse the bit order of the data word. However, the foregoing adds significant operations to the video decoder and makes accessing and decoding in the reverse order difficult to perform in real-time.

Further limitations and disadvantages of conventional and traditional systems will become apparent to one of skill in the art through comparison of such systems with the invention as set forth in the remainder of the present application with reference to the drawings.

BRIEF SUMMARY OF THE INVENTION

Presented herein is a direct memory access engine for fetching words in reverse order. In one embodiment, there is presented a method for providing a plurality of sequential data words. The method includes receiving a command to provide the plurality of sequential data words, wherein the plurality of sequential data words comprises a first data word and a last data word, and one or more data words between the first data word and the last data word, fetching a sequential portion of the sequential data words, said sequential portion comprising a first intermediate word, the last word, and one or more data words between the intermediate word and the last word, storing the sequential portion, transmitting at least a portion of the last data word, and transmitting at least a portion of the intermediate data words after transmitting at least the portion of the last data word.

In another embodiment, there is presented a system for providing a plurality of sequential data words. The system comprises a state logic machine, a memory controller, a local buffer, and a port. The state logic machine receives a command to provide the plurality of sequential of sequential data words, wherein the plurality of sequential data words comprises a first data word and a last data word, and one or more data words between the first data word and the last data word. The memory controller fetches a sequential portion of the sequential data words, said sequential portion comprising a first intermediate word, the last word, and one or more data words between the intermediate word and the last word. The local buffer stores the sequential portion. The port transmits at least a portion of the last data word and transmits at least a portion of the intermediate data words after transmitting at least the portion of the last data word.

In another embodiment, there is presented a system for decoding a video packet. The system comprises a compressed data buffer, a video decoder, and a direct memory access engine. The compressed data buffer comprises a plurality of sequential data words. The plurality of sequential data words store a video packet. The video decoder decodes the video packet. The direct memory access engine provides the video packet to the video decoder and comprises a state logic machine, a memory controller, a local buffer, and a port. The state logic machine receives a command to provide the plurality of sequential data words and a control signal indicating reverse order from the video decoder, wherein the plurality of sequential data words comprises a first data word and a last data word, and one or more data words between the first data word and the last data word. The memory controller fetches a sequential portion of the sequential data words, said sequential portion comprising a first intermediate word, the last word, and one or more data words between the intermediate word and the last word. The local buffer stores the sequential portion. The port transmits at least a portion of the last data word and transmits at least a portion of the intermediate data words after transmitting at least the portion of the last data word.

These and other advantages and novel features of the present invention, as well as details of illustrated embodiments thereof, will be more fully understood from he following description and drawings.

DETAILED DESCRIPTION OF THE INVENTION

Figure 1:
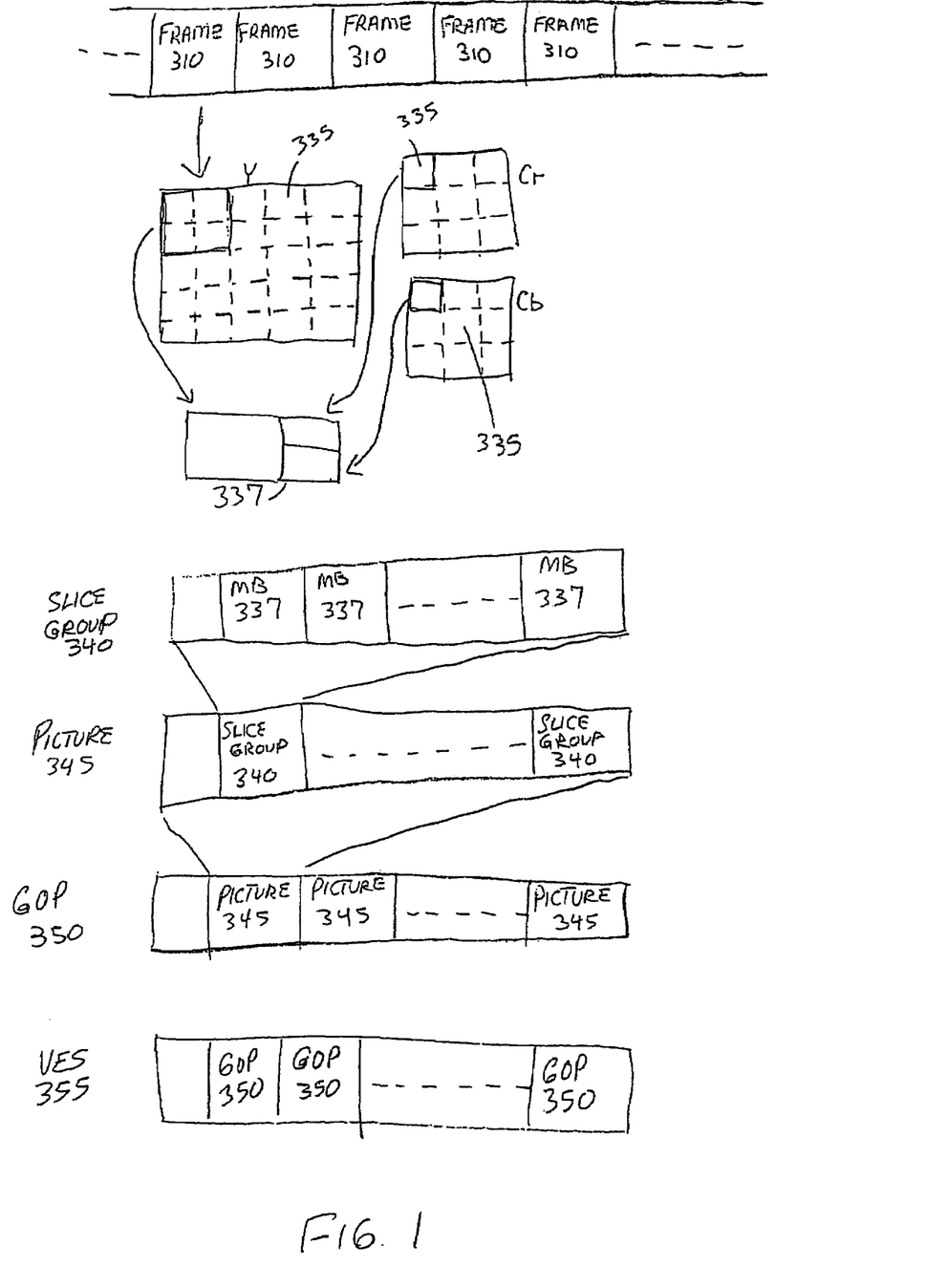
FIG. 1 is a block diagram describing the encoding of video data.

Referring now to FIG. 1, there is illustrated a block diagram describing MPEG formatting of video data 305. The video data 305 comprises a series of frames 310. Each frame comprises two dimensional grids of luminance Y, chroma red Cr, and chroma blue Cb pixels. The two-dimensional grids are divided into 8×8 blocks 335, where four blocks 335 of luminance pixels Y are associated with a block 335 of chroma red Cr, and a block 335 of chroma blue Cb pixels. The four blocks of luminance pixels Y, the block of chroma red Cr, and the chroma blue Cb form a data structure known as a macroblock 337. The macroblock 337 also includes additional parameters, including motion vectors.

The macroblocks 337 representing a frame are grouped into different video packets 340. The video packet 340 includes the macroblocks 337 in the video packet 340, as well as additional parameters describing the video packet. Each of the video packets 340 forming the frame form the data portion of a picture structure 345. The picture 345 includes the video packets 340 as well as additional parameters. The pictures are then grouped together as a group of pictures 350. The group of pictures 350 also includes additional parameters. Groups of pictures 350 are then stored, forming what is known as a video elementary stream 355. The video elementary stream 355 is then packetized to form a packetized elementary sequence. Each packet is then associated with a transport header, forming what are known as transport packets. The transport packets can be multiplexed with other transport packets carrying other content, such as another video elementary stream 355 or an audio elementary stream. The multiplexed transport packets from what is known as a transport stream. The transport stream is transmitted over a communication medium for decoding and presentation.

The foregoing provides the data words 505(x) . . . 505(n) as a set of 32 bit words starting from the last portion of 505(n) and proceeding sequentially to the first portion of 505(x). The bits forming the 32-bit words can be reversed with respect to one another, in any number of ways. For example, the MPEG video decoder 445 can include logic that reverses the 32 bits of each word. Alternatively, the DMA engine 510 can include additional circuitry 550 that causes the 32 bits of each word 611 to be provided to the MPEG video decoder 445 in the reverse order.

Figure 2:
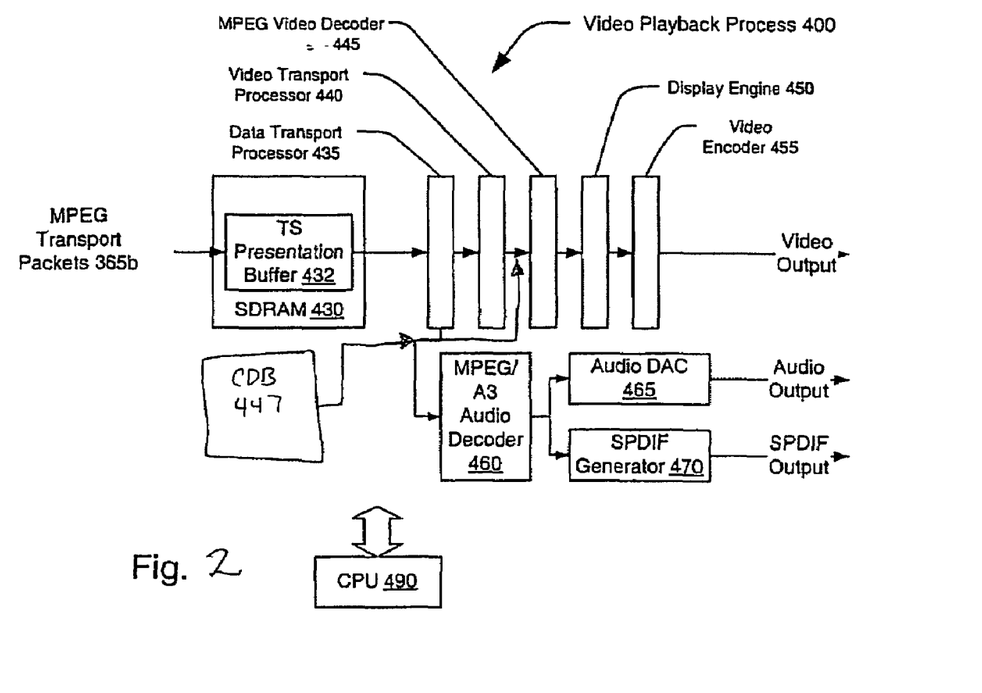
FIG. 2 is a block diagram describing an exemplary decoder in accordance with an embodiment of the present invention.

Referring now to FIG. 2, there is illustrated a block diagram of an exemplary decoder 400 for decoding compressed video data, configured in accordance with an embodiment of the present invention. A processor, that may include a CPU 490, reads a stream of transport packets (a transport stream) into a transport stream buffer 432 within an SDRAM 430.

The data is output from the transport stream presentation buffer 432 and is then passed to a data transport processor 435. The data transport processor then demultiplexes the MPEG transport stream into its PES constituents and passes the audio transport stream to an audio decoder 460 or SPDIF Generator 470 and the video transport stream to a video transport processor 440.

The video transport processor 440 converts the video transport stream into a video elementary stream and provides the video elementary stream to an MPEG video decoder 445 that decodes the video. The video elementary stream 355 is stored in a compressed data buffer (CDB) 447. The MPEG video decoder 445 accesses the compressed data buffer (CDB) to receive the video elementary stream 355. The video elementary stream 355 is decoded by the MPEG video decoder 445 resulting in the reconstructed video data 305.

The audio data is sent to the output blocks and the video data 305 is sent to a display engine 450. The display engine 450 is responsible for and operable to scale the video picture, render the graphics, and construct the complete display among other functions. Once the display is ready to be presented, it is passed to a video encoder 455 where it is converted to analog video using an internal digital to analog converter (DAC). The digital audio is converted to analog in the audio digital to analog converter (DAC) 465.

Figure 3:
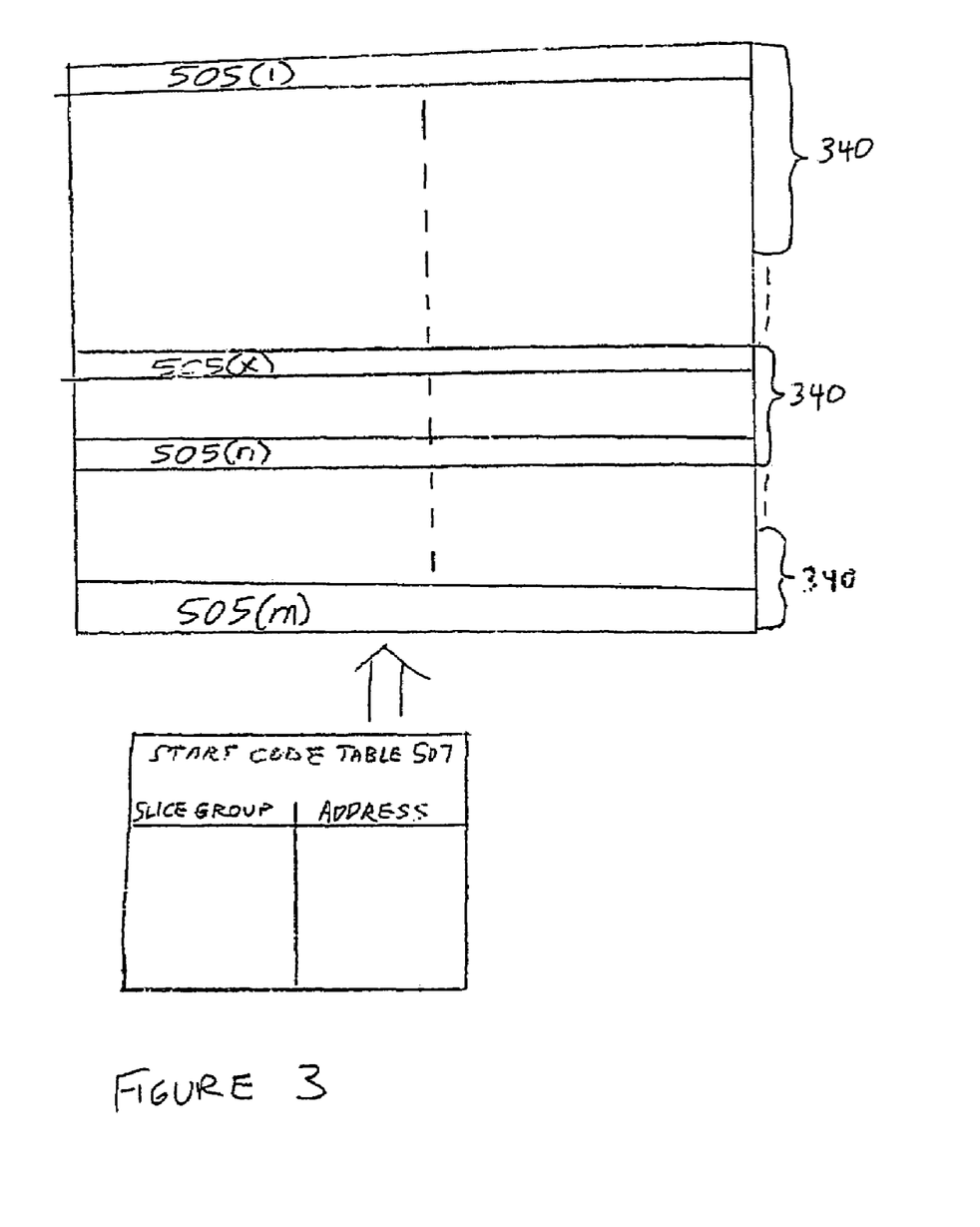
FIG. 3 is a block diagram of an exemplary compressed data buffer.

Referring now to FIG. 3, there is illustrated a block diagram describing an exemplary compressed data buffer 447. The compressed data buffer 447 includes any number of data words 505(1) . . . 505(m). The data words can have any width. In an exemplary case, for example, the data words can comprise 256 bit jumbo words (words).

The compressed data buffer 447 stores the video elementary stream 355. The video elementary stream 355 comprises any number of video packets 340. The video packets 340 further comprise a video packet header and any number of macroblocks 337. The compressed data buffer 447 also stores a start code table 507. The start code table 507 associates each video packet 340 with its starting address in the compressed data buffer 447. Alternatively the video packet 340 can be first scanned forward, without evacuating data from memory, then number of bytes/bits can be counted, and then returned using the DMA engine.

The MPEG video decoder 445 receives the video packets 340 from the video elementary stream 355 and decodes the video packets 340. The video packet 340 is received and decoded by the MPEG video decoder 445 starting from the word 505(x) storing the beginning of the video packet 340, and proceeding to the word 505(n) storing the end of the video packet 340.

A direct memory access (DMA) engine 510 facilitates receipt of the video packets 340 by the MPEG video decoder 445. Alternatively, a processor can facilitate receipt of the video packets 340. Accordingly, DMA engine 510 shall be interpreted to also include a processor that is operable to fetch video packets from memory. The MPEG video decoder 445 receives a video packet 340 by looking up the starting address and the ending address of a video packet 340 in the start code table 507. The MPEG video decoder 445 can then command the DMA engine 510 to fetch the words 505(*x*) . . . 505(*n*) that store the video packet 340. Responsive thereto, the DMA engine 510 fetches and provides the words 505(*x*) . . . 505(*n*) that store the video packet 340.

The DMA engine 510 provides the words 505(*x*) . . . 505(*n*) to an extractor 515 within the MPEG video decoder 445 in a serial manner, beginning with word 505(*x*) and proceeding to the last word 505(*n*). The MPEG decoder 445 decodes the video packet 340, in a serial manner, beginning decoding with the first word 505(*x*) and proceeding to the last word 505(*n*). The extractor 515 and the DMA engine 510 operate in conjunction with each other, such that the words 505 are provided to the MPEG video decoder 445 at a dynamic rate that is in substantial relationship to the rate that the MPEG video decoder 445 is decoding the words 505.

In MPEG-4 PART 2, the video packet 340 is defined such that the video packet 340 can be decoded in a forward order, or the reverse order. Accordingly, if the MPEG video decoder 445 encounters an error, the video decoder can go to the end of the video packet 340, and start decoding in the reverse order. For example, if the MPEG video decoder 445 decodes the video packet 340 beginning with the first word 505(*x*), and encounters an error in word 505(*x*+5), the MPEG video decoder 445 can start decoding the video packet 340 from word 505(*n*) and decode in the reverse order, e.g., word 505(*n*−1), 505(*n*−2) . . . , etc.

Upon detecting an error, the MPEG video decoder 445 transmits a command to the DMA engine 510 to fetch the words storing the video packet 340, e.g., words 510(*x*) . . . 510(*n*), along with a reverse order signal. Responsive thereto, the DMA engine 510 provides the words 510(*x*) . . . 510(*n*) in the reverse order to the MPEG video decoder 445.

Figure 4:
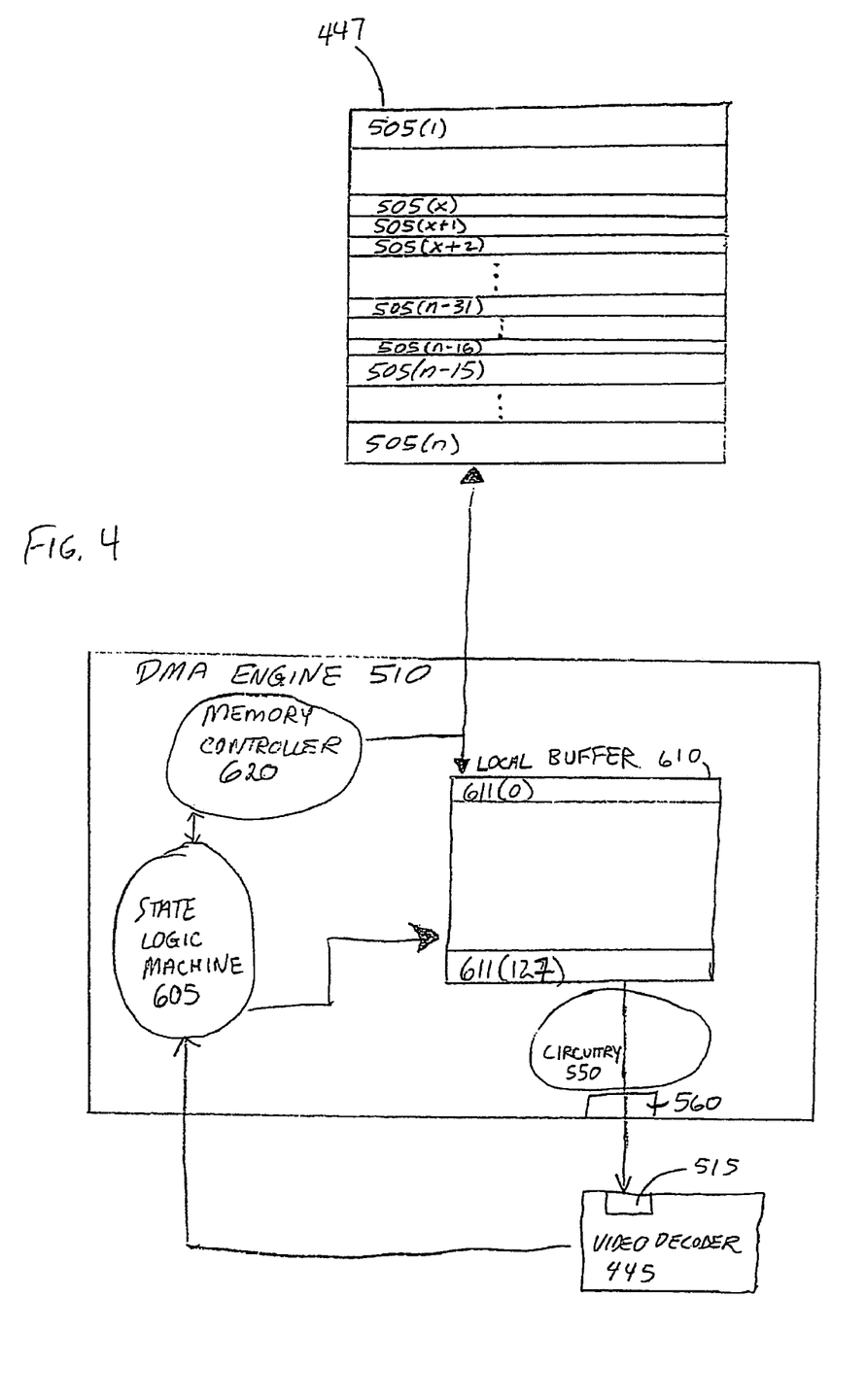
FIG. 4 is a block diagram of an exemplary direct memory access engine in accordance with an embodiment of the present invention.

Referring now to FIG. 4, there is illustrated a block diagram describing an exemplary DMA engine 510 in accordance with an embodiment of the present invention. The DMA engine 510 comprises a state logic machine 605, a local buffer 610, and a memory controller 620. The local buffer 610 can comprise any amount of memory with any width of data words. For example, in an exemplary case, the memory can comprise 128 32-bit words 611(0) . . . 611(127).

The state logic machine 605 receives a command to fetch data words in an address range, e.g., 505(*x*)-510(*n*) from the MPEG video decoder 445. The command can be accompanied by a control signal indicating that the data words in the address range are to be provided to the MPEG video decoder 445 in the reverse order, e.g., 505(*n*), 505(*n*−1) . . . 505(*x*).

Responsive to receiving a command to fetch the data words 510(*x*)-510(*n*) in the reverse order, the state logic machine 605 commands the memory controller 620 to retrieve a batch comprising a the last predetermined number of data words 505 in the provided address range, and store the predetermined number of data words in the local buffer 610. The predetermined number of data words in the batch is less than or equal to the capacity of the local buffer 610. For example, in an exemplary embodiment, where the local buffer 610 comprises 128 32-bit words, the batch of data words 505 can include the last 16 words in the provided address range, e.g., data words 505(*n*−15) . . . 505(*n*).

After the batch of data words 505(*n*−15) . . . 505(*n*) is stored in the local buffer 610, the state logic machine 605 causes the contents of the local buffer 610 to be provided to the MPEG video decoder 445 beginning with word 611(127), and proceeding sequentially to word 611(0). After the contents of the local buffer 610, e.g., words 611(127) . . . 611(0), are provided to the MPEG video decoder 445, the state logic machine 605 commands the memory controller 620 to fetch another batch comprising the predetermined number of words, e.g., data words 505(*n*−31) . . . 505(*n*−16), that precede the most recently fetched data words, e.g., data words 505(*n*−15) . . . 505(*n*). The data words 505(*n*−15) . . . 505(*n*) are stored in the local buffer 610 and provided to the MPEG decoder 445.

The foregoing is repeated until the next predetermined number of data words comprises the first data word in the address range, e.g., data word 505(*x*). Where a batch comprises the first data word in the address range, e.g., data word 505(*x*), the state logic machine 605 truncates that portion of the predetermined number of data words that precedes the first data word 505(*x*), and commands the memory controller 620 to fetch the truncated batch comprising the first data word 505(*x*) and all data words 505(*x*+1), 505(*x*+2) . . . , following the first data word 505(*x*) that have not been previously transmitted to the MPEG video decoder 445.

The foregoing provides the data words 505(*x*) . . . 505(*n*) as a set of 32 bit words starting from the last portion of 505(*n*) and proceeding sequentially to the first portion of 505(*x*). The bits forming the 32-bit words can be reversed with respect to one another, in any number of ways. For example, the MPEG video decoder 445 can include logic that reverses the 32 bits of each word. Alternatively, the DMA engine 510 can include additional circuitry that causes the 32 bits of each word 611 to be provided to the MPEG video decoder 445 in the reverse order.

Figure 5:
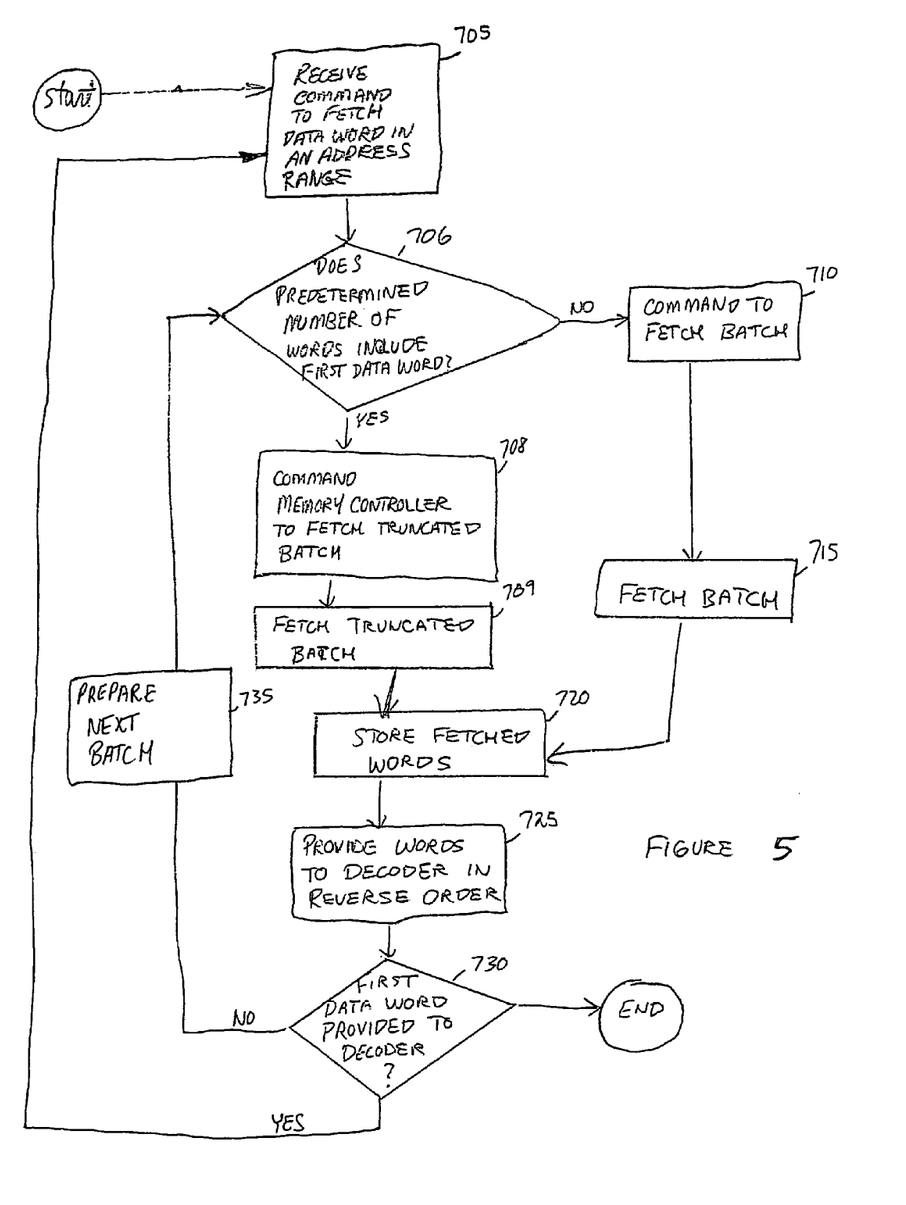
FIG. 5 is a flow diagram for accessing data words in reverse order in accordance with an embodiment of the present invention.

Referring now to FIG. 5, there is illustrated a flow diagram for providing a video packet in a reverse order. At 705, the state logic machine 605 receives a command to fetch data words in an address range, e.g., 505(*x*)-510(*n*), from the MPEG video decoder 445, accompanied by a control signal indicating that the data words in the address range are to be provided to the MPEG video decoder 445 in the reverse order, e.g., 505(*n*), 505(*n*−1) . . . 505(*x*).

Responsive to receiving the command, the state logic machine 605 determines (706) if a predetermined number of words comprises the first word, 505(*x*). Where the predetermined number of words comprises the first data word in the address range, e.g., data word 505(*x*), the state logic machine 605 truncates that portion of the predetermined number of data words that precedes the first data word 505(*x*) and commands (708) the memory controller 620 to fetch (709) the truncated batch comprising the first data word 505(*x*) and all data words 505(*x*+1), 505(*x*+2) . . . , following the first data word 505(*x*) that have not been previously transmitted to the MPEG video decoder 445. Where during 706, the state logic machine 605 determines that the predetermined number of words does not comprise the first word, 505(*x*), the state logic machine 605 commands (710) the memory controller 620 to fetch (715) a batch comprising the last predetermined number of data words 505 in the provided address range.

The fetched data words 505 are stored (720) in the local buffer 610. After the data words are stored in the local buffer 610, the state logic machine 605 causes the contents of the local buffer 610 to be provided (725) via port 560 to the MPEG video decoder 445 beginning with word 611(127), and proceeding sequentially to word 611(0). After the contents of the local buffer 610, e.g., words 611(127) . . . 611(0), are provided to the MPEG video decoder 445, a determination (730) is made whether the first data word, data word 505(*x*) has been provided to the MPEG video decoder 445. If the first data word has not been provided to the MPEG video decoder at 730, the next batch if prepared at 735, and 705-730 are repeated. If the first data word has been provided to the MPEG video decoder at 730, the process is completed.

One embodiment of the present invention may be implemented as a board level product, as a single chip, application specific integrated circuit (ASIC), or with varying levels integrated on a single chip with other portions of the system as separate components. The degree of integration of the system will primarily be determined by speed and cost considerations. Because of the sophisticated nature of modern processors, it is possible to utilize a commercially available processor, which may be implemented external to an ASIC implementation of the present system. Alternatively, if the processor is available as an ASIC core or logic block, then the commercially available processor can be implemented as part of an ASIC device with various functions implemented as firmware.

While the invention has been described with reference to certain embodiments, it will be understood by those skilled in the art that various changes may be made and equivalents may be substituted without departing from the scope of the invention. In addition, many modifications may be made to adapt particular situation or material to the teachings of the invention without departing from its scope. Therefore, it is intended that the invention not be limited to the particular embodiment(s) disclosed, but that the invention will include all embodiments falling within the scope of the appended claims.

The invention claimed is:

1. A method for providing a plurality of sequential data words, said method comprising:
   receiving a command to provide the plurality of sequential data words, wherein the plurality of sequential data words comprises a first data word and a last data word and one or more data words between the first data word and the last data word, occupying an amount of memory in a first memory;
   fetching a sequential portion of the sequential data words, said sequential portion comprising a first intermediate word, the last word, and one or more data words between the intermediate word and the last word;
   identically storing the sequential portion, in a second memory comprising less than the amount of memory occupied by the plurality of sequential data words in the first memory;
   transmitting at least a portion of the last data word; and
   transmitting at least a portion of the intermediate data words after transmitting at least the portion of the last data word.

2. The method of claim 1, further comprising:
   fetching another sequential portion of the sequential data words, the another sequential portion comprising a second intermediate data word, immediately followed one or more data words, immediately followed by a third intermediate data word, the third intermediate data word immediately preceding the first intermediate word;
   identically storing the identical another sequential portion;
   transmitting at least a portion of the third intermediate word; and
   transmitting at least a portion of the second intermediate word after transmitting at least the portion of the third intermediate word.

3. The method of claim 1, wherein storing further comprises:
   storing the sequential portion in the second memory, the second memory having a beginning address and an ending address, and wherein at least the portion of the last data word is stored at the ending address and wherein at least the portion of the first intermediate word is stored in the beginning address.

4. The method of claim 3, wherein the second memory is characterized by a width, and the data words are characterized by a width, the width of the second memory being smaller than the width of the data words.

5. The method of claim 3, wherein the last data word comprises at least the portion of the last data word and at least another portion, wherein at least the portion comprises the least significant bits of the last data word, and wherein the at least another portion comprises the most significant bits of the last data word, and wherein storing the portion further comprises:
   storing the at least another portion of the last data word at an address preceding the ending address.

6. The method of claim 5, further comprising:
   transmitting the at least another portion of the last word after transmitting at least the portion of the last word.

7. The method of claim 1, wherein the one or more data words comprise a predetermined number of data words.

8. The method of claim 1, wherein the plurality of sequential data words stores a video packet.

9. A system for providing a plurality of sequential data words, said system comprising:
   a state logic machine for receiving a command to provide the plurality of sequential data words, wherein the plurality of sequential data words comprises a first data word and a last data word, and one or more data words between the first data word and the last data word, and wherein the plurality of sequential data words occupy an amount of memory in a first memory;
   a memory controller for fetching a sequential portion of the sequential data words, said sequential portion comprising a first intermediate word, the last word, and one or more data words between the intermediate word and the last word;
   a local buffer for identically storing the sequential portion, comprising less than the amount of memory occupied by the plurality of sequential data words in the first memory; and
   a port for transmitting at least a portion of the last data word and transmitting at least a portion of the intermediate data words after transmitting at least the portion of the last data word.

10. The system of claim 9, wherein:
    the memory controller fetches another sequential portion of the sequential data words, the another sequential portion comprising a second intermediate data word, immediately followed one or more data words, immediately followed by a third intermediate data word, the third intermediate data word immediately preceding the first intermediate word;
    the local buffer identically stores the another sequential portion; and
    the port transmits at least a portion of the third intermediate word and transmits at least a portion of the second intermediate word after transmitting at least the portion of the third intermediate word.

11. The system of claim 9, wherein the local buffer is associated with a beginning address and an ending address, and wherein a memory location at the ending address stores at least the portion of the last data word and wherein at memory location at the beginning address stores at least the portion of the first intermediate word.

12. The system of claim 11, wherein the local buffer is characterized by a width, and the data words are characterized by a width, the width of the local buffer being smaller than the width of the data words.

13. The system of claim 11, wherein the last data word comprises at least the portion of the last data word and at least another portion, wherein at least the portion comprises the least significant bits of the last data word, and wherein the at least another portion comprises the most significant bits of the last data word, and wherein a memory location at an address preceding the ending address stores the at least another portion of the last data word.

14. The system of claim 13, wherein the port transmits the at least another portion of the last word after transmitting at least the portion of the last word.

15. The system of claim 9, wherein the one or more data words comprise a predetermined number of data words.

16. The system of claim 9, wherein the plurality of sequential data words stores a video packet.

17. A system for decoding a video packet, said system comprising:
a compressed data buffer comprising a plurality of sequential data words, the plurality of sequential data words for storing a video packet, and wherein the plurality of sequential data words occupy an amount of memory in the compressed data buffer;
a video decoder for decoding the video packet; and
a direct memory access engine for providing the video packet to the video decoder, the direct memory access engine comprising:
a state logic machine for receiving a command to provide the plurality of sequential data words and a control signal indicating reverse order from the video decoder, wherein the plurality of sequential data words comprises a first data word and a last data word, and one or more data words between the first data word and the last data word;
a memory controller for fetching a sequential portion of the sequential data words, said sequential portion comprising a first intermediate word, the last word, and one or more data words between the intermediate word and the last word;
a local buffer for identically storing the sequential portion, comprising less than the amount of memory occupied by the plurality of sequential data words in the compressed data buffer; and
a port for transmitting at least a portion of the last data word and transmitting at least a portion of the intermediate data words after transmitting at least the portion of the last data word.

* * * * *